Dec. 23, 1958   A. L. SPANGENBERG   2,865,515
CONNECTING LINK
Filed May 6, 1955
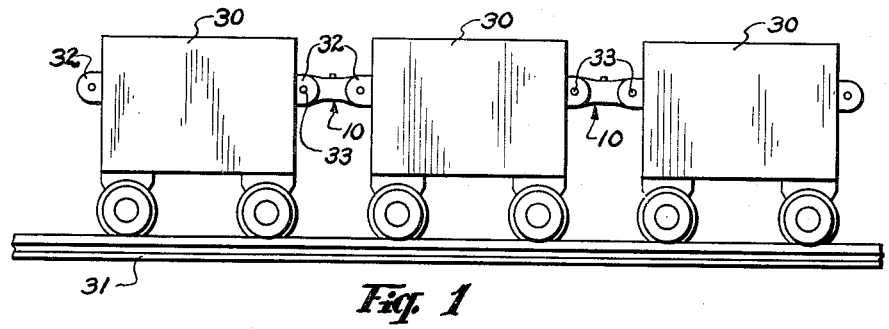
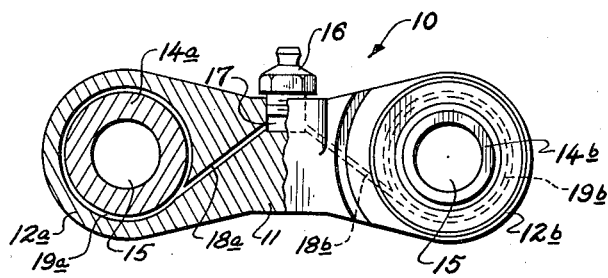
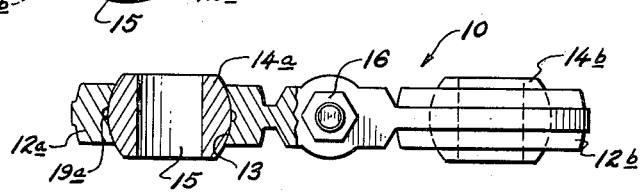
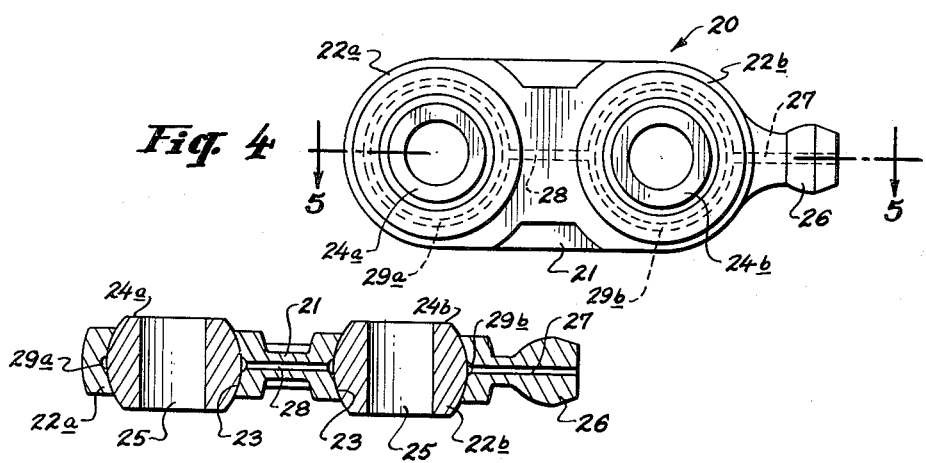
INVENTOR.
ALFRED L. SPANGENBERG
BY
Pollard Johnston Smythe & Robertson
ATTORNEYS.

United States Patent Office 2,865,515
Patented Dec. 23, 1958

2,865,515

CONNECTING LINK

Alfred L. Spangenberg, Weston, Conn., assignor, by mesne assignments, to Stephens-Adamson Mfg. Co., a corporation of Illinois Application May 6, 1955, Serial No. 506,512

6 Claims. (Cl. 213—208)

The present invention relates generally to connecting links or the like for transmitting motion from one body to another, and particularly to a connecting link for use between bodies which are susceptible to misalignment or movement relative to each other in more than one plane.

An object of the invention is to provide a connecting link embodying self-aligning bearings adjacent its opposite ends by which the link may be attached to bodies movable relative to each other in more than one plane, so that the connecting link can smoothly transmit a force between the bodies without being influenced by misalignment of the latter.

Another object is to provide a connecting link of the described character which is constructed and arranged for economy of manufacture and maintenance.

Still another object is to provide a connecting link of the described character having a simple lubricating system embodied therein for simultaneously lubricating the self-aligning bearings at the ends of the link.

In accordance with this invention, the foregoing objects may be realized by providing a connecting link which includes a generally elongated, preferably one-piece body having annular portions at the opposite ends which are formed with spherical inner surfaces to define the outer race members of self-aligning bearings, and ball-shaped inner bearing members accommodated in said outer race members and capable of independent universal movement relative to the link body, the inner bearing members having diametrical bores extending therethrough to receive pins, shafts or the like for attaching the link to the relatively movable bodies between which a force or movement is to be transmitted.

Another feature of the invention resides in the provision of lubricating passages within the link body which extend from a single lubricating fitting on the exterior of the link body and open at the spherical surfaces of the race members for supplying lubricant to the contacting surfaces of the race members and inner bearing members.

The above, and other objects, features and advantages of the invention will be apparent in the following detailed description of illustrative embodiments thereof, particularly when that description is read in connection with the accompanying drawing forming a part hereof, and wherein:

Fig. 1 is a side elevational view of a series of carts which are connected together by links embodying this invention to form a conveyor;

Fig. 2 is an enlarged side elevational view, partly broken away and in section, one of the connecting links employed in the conveyor of Fig. 1;

Fig. 3 is a top plan view, partly broken away and in section, of the connecting link of Fig. 2;

Fig. 4 is a side elevational view of another connecting link embodying the present invention; and Fig. 5 is a longitudinal sectional view taken along the line 5—5 of Fig. 4.

Referring to the drawing in detail, and initially to Figs. 2 and 3 thereof, a connecting link embodying this invention is there illustrated and generally identified by the reference numeral 10. The connecting link 10 includes a generally elongated body 11 having annular portions 12a and 12b at the opposite ends and preferably as integral parts thereof.

The annular portions 12a and 12b have spherical inner surfaces 13 (Fig. 3) to define the outer race members of self-aligning bearings, and inner bearing members 14a and 14b are accommodated within the race members 12a and 12b, respectively. The inner race members 14a and 14b have ball-shaped or spherical outer surfaces with diameters only slightly less than the diameters of the spherical inner surfaces 13 of the outer race members so that the inner bearing members are retained within the outer race members 12a and 12b, while being free to engage in independent universal movement with respect to the body 11 and the outer race members at the opposite ends of the latter.

Each of the inner bearing members 14a and 14b has a diametrical bore 15 extending therethrough to receive a pin, shaft, pivot or the like for attaching the related end of the connecting link to a body or member to which, or from which, a force or movement is to be transmitted.

In order to ensure the freedom of movement of the inner bearing members 14a and 14b within the race members 12a and 12b, the connecting link 10 includes an arrangement for supplying or distributing lubricant to the contacting spherical surfaces of the outer race members and inner bearing members at the opposite ends of the body 11. In accordance with this invention, such lubricating arrangement includes a single entrance for the lubricant on the link body and ducts or passages extending from the entrance to the spherical inner surfaces 13 of both race members 12a and 12b where the lubricant is distributed.

In the connecting link 10 of Figs. 2 and 3, the lubricating arrangement includes a conventional lubricating fitting 16 which is centrally located with respect to the self-aligning bearings at the opposite ends of the link, the fitting 16 being threaded, or otherwise secured, in a blind bore 17 which opens at one of the longitudinal edges of the body 11. The fitting 16 is formed to be engaged by a conventional lubricating "gun" which delivers a supply of lubricant to the bore 17 through the central opening of the lubricating fitting. Passages 18a and 18b (Fig. 2) diverge from the blind bore 17 and, at their ends remote from the latter, open tangentially into annular grooves 19a and 19b, which extend circumferentially in the inner surfaces 13 of the race members 12a and 12b, respectively. Thus, the passages 18a and 18b convey the lubricant to the grooves 19a and 19b, respectively, and the latter, opening radially inward against the spherical outer surfaces of the inner bearing members 14a and 14b, serve to distribute the lubricant between the contacting surfaces of the outer race members and the inner bearing members, particularly as the latter engage in universal movements with respect to the body 11.

In Figs. 4 and 5 of the drawing, a connecting link constructed in accordance with another embodiment of the invention is illustrated and generally identified by the reference numeral 20. The link 20 is generally similar to that described above in connection with Figs. 2 and 3 and includes a body 21 having annular portions 22a and 22b at its opposite ends, preferably as integral parts thereof, and each formed with a spherical inner surface 23 to define outer race members accommodating ball-shaped inner bearing members 24a and 24b which are universally movable relative to the body 21. The bearing members 24a and 24b have diametrical bores 25 extending therethrough for receiving pins, shafts, pivots or the like, by which the connecting link can be attached to the bodies or members between which the link is to transmit a force or movement.

As in the embodiment of Figs. 2 and 3, the connecting link 20 has a lubricating arrangement for distributing lubricant from a single point of entry to the contacting surfaces of both outer race members with the related ball-shaped inner bearing members. However, contrary to the first described embodiment, the single entry for the lubricant is not disposed centrally with respect to the self-aligning bearings at the ends of the body 21, but is in the form of an integral projection 26 extending from the periphery of the outer race member 22b in the longitudinal direction of the link 20. The projection 26 has an outer surface corresponding to that of the usual lubricant fitting for engagement by a conventional lubricating gun, and a central bore 27 extends longitudinally through the projection 26 (Fig. 5) and opens, at its opposite ends, to the atmosphere and to an annular groove 29b extending circumferentially in the inner surface 23 of outer race member 22b. The lubricating arrangement of the connecting link 20 is completed by another longitudinal passage 28 extending between the annular groove 29b and a similar or corresponding annular groove 29a in the surface 23 of outer race member 22a. Thus, the lubricant supplied to the passage 27 from a lubricating gun engaging the projection 26 is conveyed by the passage 27 into the groove 29b and from the latter, by the passage 28, into the groove 29a, whereby the lubricant is distributed between the contacting surfaces of the outer race members 22a and 22b and the related inner bearing members 24a and 24b.

In Fig. 1, one of the many possible applications of connecting links embodying this invention has been illustrated. Specifically, the drawing shows the use of such connecting links, for example, the links 10 of Figs. 2 and 3, as couplings between successive load carrying carts 30, or the like, which may run on rails 31 and form a train of such carts or a continuous conveyor. The carts 30 are provided with suitable brackets 32 at their opposite ends which carry pins 33 to be received in the inner bearing members at the related ends of the connecting links between the carts.

Since the connecting links are attached to the successive carts by self-aligning bearings, it is apparent that the successive carts can move relative to each other in more than one plane, for example, relative movement combining horizontal, vertical and twisting components, without any resistance from the connecting links or binding at the points of attachment of the links to the successive carts. Thus, excessive stressing or wear of the connecting links is avoided.

Although the connecting links embodying this invention have been shown employed as couplings between carts in a conveyor or train, it is apparent that the links are not limited to use for that purpose. For example, connecting links of the described character can be advantageously employed to transmit the motion between a rotary crank pin and a linearly reciprocating piston or slide so that misalignment between the rotating and linearly reciprocating elements of the structure in more than one plane can be accommodated by the two universally movable, self-aligning bearings. Generally speaking, connecting links of the described character can be employed wherever it is necessary to transmit a force or movement between two bodies or members which are capable of misalignment or movement relative to each other in more than one plane, and additional applications having this characteristic will be apparent.

From the foregoing it will be seen that connecting links embodying this invention are generally of three-piece construction, that is, a body formed to provide outer race members at its opposite ends and ball-shaped inner bearing members held in such race members, thereby resulting in great ruggedness and economy in manufacture. Further, it is to be noted that the described links embody lubricating systems which supply lubricant to both self-aligning bearings from a single point of application, thereby substantially simplifying the periodic lubrication of assemblies including a large number of such links.

Although particular embodiments of the invention have been described in detail herein and illustrated in the accompanying drawing, it is to be understood that the invention is not limited to these particular embodiments, and that various changes and modifications can be effected therein without departing from the scope or spirit of the invention, except as indicated in the appended claims.

What is claimed is:

1. A connecting link comprising an elongated body, self-aligning bearings at the opposite ends of said body, each of said bearings including an annular outer race and an inner bearing member held within the related outer race and free to move universally with respect to the latter, and means for distributing lubricant between the contacting surfaces of the outer race and inner bearing member of each of said self-aligning bearings.

2. A connecting link comprising an elongated body, self-aligning bearings at the opposite ends of said body, each of said bearings including an annular outer race and an inner bearing member held within the related outer race and free to move universally with respect to the latter, and means for distributing lubricant between the contacting surfaces of the outer race and inner bearing member of both of said self-aligning bearings from a single point of lubricant application at the exterior of said body.

3. A connecting link comprising an elongated body having integral annular portions at the opposite ends which are formed with spherical inner surfaces to define outer races of self-aligning bearings, said self-aligning bearings being completed by ball-shaped inner bearing members embraced by the spherical inner surfaces of the related annular portions and thereby held within the latter while being free to move universally with respect to said body, whereby said body and inner bearing members form a link of three-piece construction which is able to transmit a force between members susceptible of misalignment in more than one plane and to which said inner bearing members are attached.

4. A connecting link comprising an elongated body having integral annular portions at the opposite ends which are formed with spherical inner surfaces to define outer races of self-aligning bearings, said self-aligning bearings being completed by ball-shaped inner bearing members embraced by the spherical inner surfaces of the related annular portions and thereby held within the latter while being free to move universally with respect to said body, whereby said body and inner bearing members form a link of three-piece construction which is able to transmit a force between members susceptible of misalignment in more than one plane and to which said inner bearing members are attached, and means on the exterior of said body defining a single fitting for receiving a supply of lubricant, said body having a system of interior passages extending from said single fitting and opening at said spherical inner surfaces of both annular race defining portions about 360° for distributing lubricant between the contacting surfaces of the outer race and inner bearing member of both self-aligning bearings.

5. A three piece connecting link comprising an elongated body having integral annular portions at the opposite ends which are formed with spherical inner surfaces to define outer races of self-aligning bearings, said self-aligning bearings being completed by ball-shaped inner bearing members embraced by the spherical inner surfaces of the related annular portions and thereby held within the latter while being free to move universally with respect to said body, whereby said body and inner bearing members form a link of three-piece construction which is able to transmit a force between members susceptible of misalignment in more than one plane and to which said inner bearing members are attached, and means on the exterior of said body disposed centrally with respect to said annular portions and defining a single fitting for receiving a supply of lubricant, each of said inner spherical surfaces of the annular portions having an annular, circumferentially extending groove therein opening against the related ball-shaped inner bearing member, said body having branched passages extending from said single fitting and opening tangentially into said grooves for distributing lubricant between the contacting surfaces of the outer race and inner bearing member of both self-aligning bearings.

6. A three piece connecting link comprising an elongated body having integral annular portions at the opposite ends which are formed with spherical inner surfaces to define outer races of self-aligning bearings, said self-aligning bearings being completed by ball-shaped inner bearing members embraced by the spherical inner surfaces of the related annular portions and thereby held within the latter while being free to move universally with respect to said body, whereby said body and inner bearing members form a link of three-piece construction which is able to transmit a force between members susceptible of misalignment in more than one plane and to which said inner bearing members are attached, and means on the exterior of said body at one end of the latter defining a single fitting for receiving a supply of lubricant, each of said spherical inner surfaces of the annular portions having an annular, circumferentially extending groove therein opening against the related ball-shaped inner bearing member, said body having interior passages extending from said fitting to the adjacent groove and from the latter to the other of said grooves for distributing lubricant between the contacting surfaces of the outer race and inner bearing member of both self-aligning bearings.

References Cited in the file of this patent
UNITED STATES PATENTS

| | | |
|---|---|---|
| 69,130 | Marston | Oct. 26, 1869 |
| 743,925 | Procunier | Nov. 10, 1903 |
| 807,933 | Jackman | Dec. 19, 1905 |
| 1,233,534 | Wertz | July 17, 1917 |
| 1,472,049 | Clark | Oct. 30, 1923 |
| 1,480,678 | Feucht | Jan. 15, 1924 |
| 1,985,379 | Maconaghie | Dec. 25, 1934 |
| 1,996,586 | Meyer | Apr. 2, 1935 |
| 2,285,145 | Burt | Jan. 2, 1942 |
| 2,766,079 | Browne | Oct. 9, 1956 |